Sept. 28, 1971  J. MARCOVITCH  3,608,138
APPARATUS FOR ROLLING AND FORMING ARTICLE
Filed Dec. 22, 1969  2 Sheets-Sheet 1

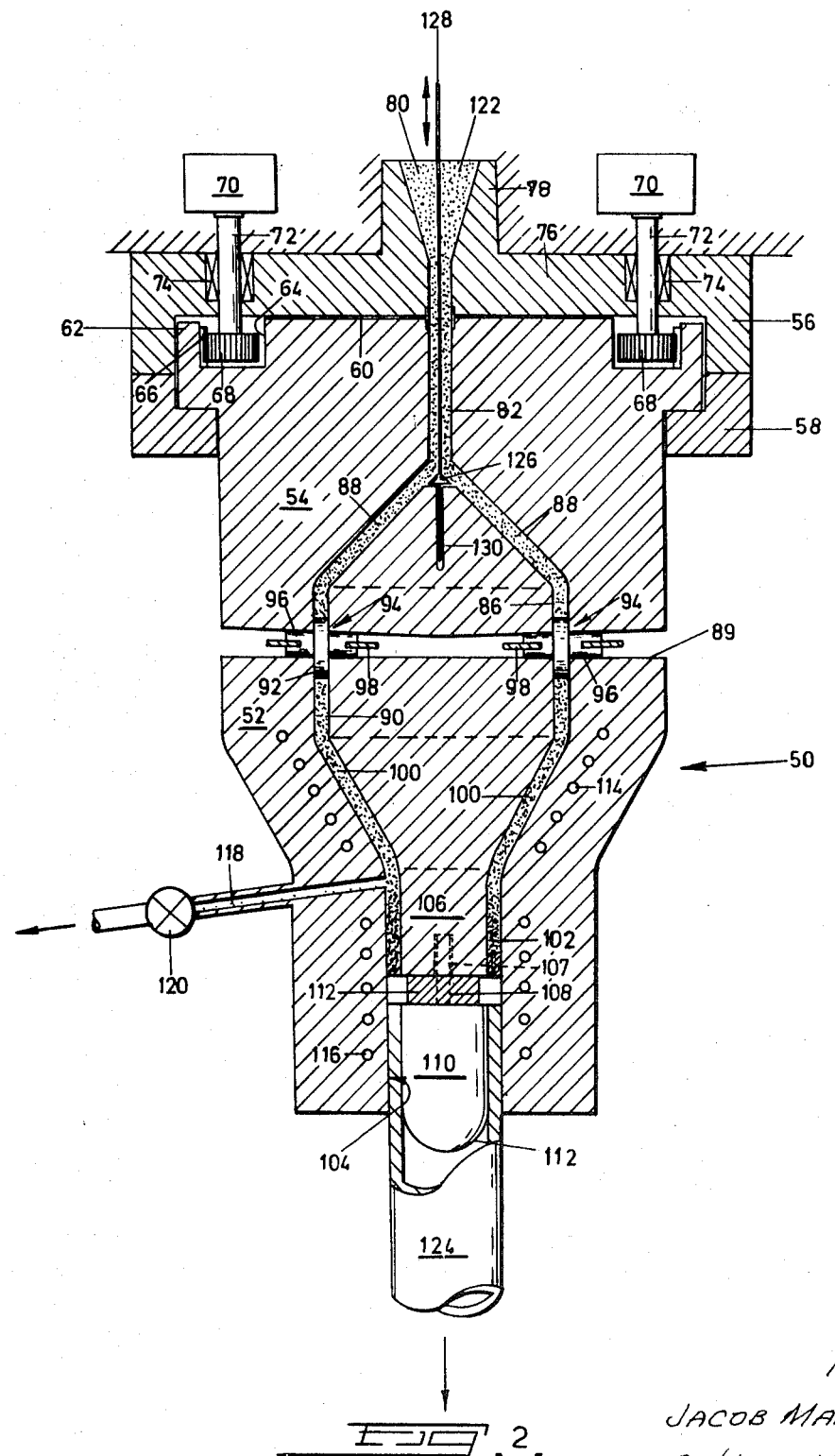

United States Patent Office 3,608,138
Patented Sept. 28, 1971

3,608,138
APPARATUS FOR ROLLING AND FORMING ARTICLES
Jacob Marcovitch, Johannesburg, Transvaal, Republic of South Africa, assignor to Rotary Profile Anstalt, Vaduz, Liechtenstein
Continuation-in-part of application Ser. No. 615,613, Feb. 13, 1967, now Patent No. 3,533,259. This application Dec. 22, 1969, Ser. No. 886,994
Claims priority, application Republic of South Africa, Feb. 14, 1966, 66/804
Int. Cl. B29f *3/012*
U.S. Cl. 18—12R                   11 Claims

ABSTRACT OF THE DISCLOSURE

An extruder for continuously extruding articles is provided. The extruder has a body with a nozzle, an open end and conduits joining the open end and the nozzle. The material to be extruded is contained within the extruder body. A number of rollers are received in the open end of the extruder body and roll on the surface of the material. Backing means are also provided against which the rollers roll.

---

This application is a continuation-in-part of my copending patent application No. 615,613 filed Feb. 13, 1967, Pat. No. 3,533,259.

This invention relates to extruders for continuously extruding articles.

In all extruders known to the inventor where it has been necessary to extrude the material under very high pressures, it is necessary to apply such pressures by moving a piston forwardly in a cylinder to apply pressure to the materials. This necessarily means that the extrusion process is either an intermittent process or that the items being extruded are of a low material content.

It is an object of the invention to provide apparatus which can extrude great lengths of material.

It is a further object of this invention to provide such apparatus which is continuously operating and which extrudes material under very high pressures.

SHORT DESCRIPTION OF DRAWINGS

Two embodiments of the invention and illustrations of typical sections which may be extruded will be described by way of example with reference to the accompanying drawings.

In the drawings:

FIG. 2 is a section similar to FIG. 1 of another extruder of the invention, and

FIG. 1

Figure 1:
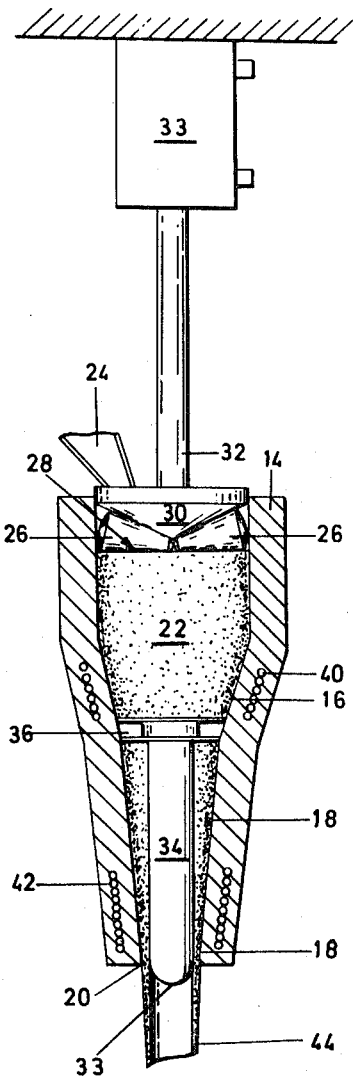
FIG. 1 is a section through an extruder of the invention.

In FIG. 1 there is shown an extruder 10 having an extruder body 12 which is provided with a cylindrical upper portion 14 and two tapering sections 16 and 18 which lead to a nozzle 20. The upper cylindrical portion 14 is open and receives therein the material 22 to be extruded, which material 22 is in granular form. A spout or like feeder 24 is provided for continuously feeding the granular material 22 into the body 12 of the extruder 10.

Also received in the open end of the cylindrical part 14 of the body 12 there are a number of frusto-conical rollers 26 which roll on the upper surface 28 of the material 22. These rollers 26 are backed by a conical backing member 30 which is carried by a shaft 32 that is connected to hydraulic jack means 33 for maintaining downward pressure and similar means (not shown) for rotating the conical member 30. The jack means 33 also serves to raise the backing member 30 to gain access to the open end of the extruder.

A central cylindrical core 34 is carried by a spider 36 located in the upper of the tapering portion 16 of the extruder body 12. This core 34 extends beyond the outlet to the nozzle and has its lower end 36 rounded.

Within the tapering portion 16 of the extruder body 12 there are provided a plurality of heating coils 40 which are arranged to heat the granular material 22 to make it more plasticised. In the lower tapering portion 18 of the extruder body 12 near the nozzle 20 there are provided a plurality of cooling coils 42 for cooling the material being extruded from the body members.

In operation the material to be extruded is continuously fed through the hopper 24 into the body 12 of the extruder 10 between the rollers 26. These rollers act on the material 22 in the extruder body 12 and may apply an extremely high pressure (of the order of 100–150 tons per square inch) to them. It will be seen that as these rollers 26 rotate they apply pressure over different parts of the surface 28 of the material 22 and this pressure causes the granular material to compact and to be urged towards the nozzle 20. During compaction the material 22 tends to become more plastic and this is accentuated by the heating coils 40. In this way the material 22 which is being continuously replenished will be forced downwardly by the rollers 26 and will be extruded out of the nozzle 20. Immediately prior to such extrusion the material 22 is cooled by the cooling coils 42 so that the tube 44 being extruded will have sufficient rigidity to support its shape after extrusion.

It will be seen that with this apparatus a tube 44 of theoretically infinite length can be extruded.

It is to be noted that the spider 36 may have been non-permanently located within the extruder body 12 so that the core 34 may be removed. Alternatively the spider 36 may be permanently secured into position and the core 34 releasably secured to the spider 36.

The heating coils 40 are preferably induction coils. The cooling coils 42 preferably allow cooling fluid to circulate therein.

FIG. 2

In FIG. 2 there is shown an extruder 50 having an extruder body 52 and above it a pressure member 54. The extruder body 52 is carried by a framework (not shown) rigidly. The pressure plate 54 is carried within a fixed frame 56 that is provided with an L-section lower part 58 attached thereto to hold the pressure plate in position. This pressure member 54 bears against a thrust plate 60 of the frame 56. The pressure plate 54 is provided with a flange 62 in which is formed an annular recess 64 the outside wall 66 of which is toothed. Meshing with the toothed wall 66 are a number of pinions 68 (two shown)

which are driven by hydraulic motors 70 through drive shafts 72 journalled in bearings 74.

The base 76 of the frame 56 is provided centrally with a boss 78 having a tapering throat 80 connected to the lower end of the hopper (not shown). This throat 80 leads to and connects with a throat 82 in the thrust plate 54.

The lower face 84 of the thrust plate 54 is slightly coned and is provided with an annular recess 86. The passage 82 is divided into a number of small passages 88 (two shown) which lead into the annular recess 86.

The body 52 of the extruder 50 is provided in its flat upper face 89, with a recess 90 corresponding to and in register with the recess 86. This recess 90 constitutes the upper open end of the extruder body 52.

Within the recesses 86 and 90 are received the cylindrical central portions 92 of pressure rollers 94. Each pressure roller 94 has frusto-conical stub shafts 96 which are of progressively smaller diameter from one end of the roller to the other. The cone angle of the stub shafts 96 is the complement of the cone angle of the face 84 and of considerably greater length than the axial length of the central portion 92. A suitable cage 98 serves to keep them spaced apart.

A number of conduits 100 lead from the annulus 90 towards a lower annulus 102 formed at the lower part of the extruder body 52. A cylindrical passage 104 continues to the lower end of the extruder body 52 to form at its open end an extruder nozzle. The part 106 of the extruder body 52 within the annular portion 102 has a central screw threaded blind bore 107 into which is received the shank 108 of a core 110. The lower end 112 of this core 110 is domed as in the first embodiment and projects through the nozzle. The shank 108 passes through a forming member 112 provided for the purpose that will be described hereinafter.

Heating coils 114 which may be similar to the heating coils 40 on the first embodiment are provided in the extruder body 52 adjacent to the conduits 100. Cooling coils 116 are located adjacent to the core 110.

At the upper part of the annulus 102 there is provided a bleed conduit 118 which is controlled by a valve 120 and which is provided to bleed off any impurities which may be in the metal. Of course, it is assumed that it is desired to melt the material under these conditions.

In operation the material 122 is fed into the bore 80 of the boss 78 and falls via a conduit 82 and 88 into the annulus 86. Here the material 122 by-passes the rollers 94 and falls into the annulus 90. The material 122 in the annulus 90 is subjected to pressure from the rollers 94 when the thrust member 54 is rotated by means of the hydraulic motor 70 through the pinions 78. The central portions 92 of the rollers 94 apply a very high pressure to the material compacting it and making it plastic. As the material 122 passes the coils 114 it is made more fluent and is forced downwardly through the conduits 100 to the annulus 102. The material passes the forming member 112 and then is extruded between the core 110 and the part 104 of the extruder body 52. In this way a continuous pipe 124 may be extruded continually.

It will be noted that the stub shafts 96 of the rollers 94 will be held off the surface 89 by the raised portion 92 which acts on the material.

Before extrusion commences it may be desirable to bleed off any impurities in the material through the bleed passage 118.

In order to control the amount of material being fed into the annulus 90, there is provided a control valve or feed adjuster 126 which is located in the thrust member 54 near the bottom end of the conduit 82. This feed adjuster 126 is a conical member carried by a rod 128 the lower end of which is guided in a short passage 130. By raising and lowering the rod 128 the feed adjuster can obturate greater amounts of the lower end of the conduit 82 thereby controlling the amount of material flowing through the conduits 88.

Figure 3:
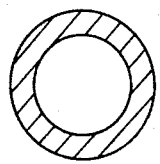
FIGS. 3, 4, 5, 6, 7, 8 and 9 are respectively sections of materials that may be extruded by the extruders of the invention.
Figure 4:
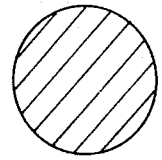

FIGS. 3 and 4

The extruders 10 and 50 as shown will extrude hollow concentric piping having a section as shown in FIG. 3. If however, the cores 45 or 110 respectively are removed, the extruders 10 and 50 will extrude solid rods of a section shown in FIG. 4.

Figure 5:
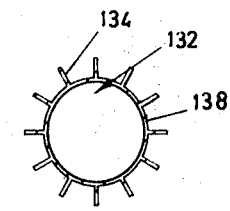
Figure 6:
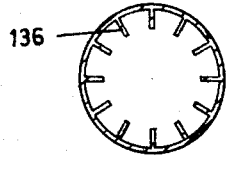
Figure 7:
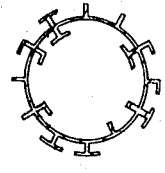

FIGS. 5, 6 and 7

If the former member 112 of the extruder 50 or a similar member in the extruder 10 (not shown) is suitably shaped, the piping 132 extruded by the extruder 50 can have external fins 134 as shown in FIG. 5 or internal fins 136 as shown in FIG. 6. The piping can also have internal and external fins which may be variously shaped as shown in FIG. 7.

Where external fins are being extruded, I have found that the outside parts of the forming member 112, which in use will lie between the fins 132, can be annexed to the central portion of the forming member by thin veins. These veins will initially form an aperture in the material being extruded but this material will come together to form a continuous ring 138 as shown in FIG. 5.

Figure 8:
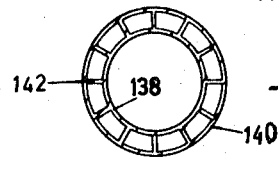
Figure 9:

FIGS. 8 and 9

The phenonemon described in the last paragraph enables one to extrude double walled members as shown in FIGS. 8 and 9 where, respectively, the inner wall 138 is joined to the outer wall 140 by radially extending webs 142 or by inclined webs 144 forming a triangulated arrangement. Any of these tubular products may be cut up and subsequently flattened for use as panels.

It will be appreciated that any other suitable shape may be extruded with suitable use of nozzles and forming members. Also a number of wire strands may be extruded in this way.

If desired the lower portion of the nozzle may have a lining member having slots therein so as to facilitate the formation of external longitudinal extending fins.

It will also be understood that rollers of other shapes may be provided and that the machine could be operated in a controlled atmosphere. It is equally suitable for most metals and plastics.

I claim:
1. An extruder comprising:
   (a) an extruder body having a nozzle, an open end, and conduits joining the open end to the nozzle,
   (b) material to be extruded contained within the extruder body,
   (c) a plurality of rollers at least partially received in the open end of the extruder body and rolling on the surface of the material, and
   (d) backing means having surface parts on which the rollers roll.
2. An extruder as claimed in claim 1, further including heating means in the extruder body to heat the material contained in the extruder body.
3. An extruder as claimed in claim 1, further including cooling coils located in the extruder body and near the nozzle to cool the material being extruded from the extruder.
4. An extruder as claimed in claim 1, in which the material is granular.
5. Apparatus as claimed in claim 1, further including means for continually feeding the material into the extruder body.
6. Apparatus as claimed in claim 5, wherein said means comprises a spout.
7. Apparatus as claimed in claim 5, in which the said means includes a conduit passing through the backing means.

8. An extruder as claimed in claim 5 further including means to regulate the amount of flow of material into the extruder body.

9. An extruder as claimed in claim 1 further including a lead conduit leading from the extruder body near the nozzle.

10. An extruder as claimed in claim 1 further including a core located within the nozzle.

11. An extruder as claimed in claim 1 further including means located within the nozzle to apply a profile to the parts extruded by the extruder.

References Cited

UNITED STATES PATENTS

| | | | |
|---|---|---|---|
| 2,171,039 | 8/1939 | Meakin | 18—12RRX |
| 2,813,299 | 11/1957 | Massey | 18—12RRX |
| 2,958,900 | 11/1960 | Meakin | 18—12RR |
| 3,016,026 | 1/1962 | Sörensen | 107—14 |

J. SPENCER OVERHOLSER, Primary Examiner

N. E. LEHRER, Assistant Examiner

U.S. Cl. X.R.

18—1E, 12RR, 14R; 264—176